US012768945B2

(12) United States Patent
Hafellner et al.

(10) Patent No.: US 12,768,945 B2
(45) Date of Patent: Oct. 20, 2026

(54) DUMMY APPARATUS WITH MOVABLE RADAR REFLECTING ELEMENTS FOR TESTING DRIVER ASSISTANCE SYSTEMS

(71) Applicant: 4ACTIVESYSTEMS GMBH, Traboch (AT)

(72) Inventors: Reinhard Hafellner, Spielberg (AT); Martin Fritz, Kobenz (AT)

(73) Assignee: 4activesystems GmbH, Traboch (AT)

( * ) Notice: Subject to any disclaimer, the term of this patent is extended or adjusted under 35 U.S.C. 154(b) by 248 days.

(21) Appl. No.: 17/423,374

(22) PCT Filed: Jan. 16, 2020

(86) PCT No.: PCT/EP2020/051023

§ 371 (c)(1),
(2) Date: Jul. 15, 2021

(87) PCT Pub. No.: WO2020/148386

PCT Pub. Date: Jul. 23, 2020

(65) Prior Publication Data

US 2022/0128656 A1 Apr. 28, 2022

(30) Foreign Application Priority Data

Jan. 16, 2019 (DE) ..................... 10-2019-101-100.0

(51) Int. Cl.
*G01S 7/40* (2006.01)
*G01S 13/931* (2020.01)

(52) U.S. Cl.
CPC .......... *G01S 7/4095* (2021.05); *G01S 7/4086* (2021.05); *G01S 13/931* (2013.01)

(58) Field of Classification Search
CPC ........... G01S 13/931; G01S 7/40–4095; G01S 7/497–4972
See application file for complete search history.

(56) References Cited

U.S. PATENT DOCUMENTS 4,233,605 A * 11/1980 Coleman ................ F41H 11/02 342/6
9,355,576 B2 5/2016 Fritz
(Continued)

FOREIGN PATENT DOCUMENTS

DE 2929814 1/1981
DE 102013113466 6/2015
(Continued)

OTHER PUBLICATIONS

US 11,009,429 B2, 05/2021, Hafellner et al. (withdrawn)
(Continued)

*Primary Examiner* — Matthew M Barker
(74) *Attorney, Agent, or Firm* — Robert A. Blaha; Smith Tempel Blaha LLC

(57) ABSTRACT

A dummy device for performing tests for driver assistance systems. The dummy device includes a base body with a simulation region, wherein the base body depicts an object to be simulated and the simulation region depicts a movable part of the object the simulated, and at least one simulation element which is arranged at the simulation region. The simulation element is configured to reflect and/or to emit signals such that a motion of the movable part of the object to be simulated is simulatable.

19 Claims, 5 Drawing Sheets

(56) References Cited

U.S. PATENT DOCUMENTS

| | | | | |
|---|---|---|---|---|
| 9,733,342 | B1 * | 8/2017 | Brown | G01S 13/931 |
| 9,870,722 | B2 * | 1/2018 | Fritz | G09B 9/006 |
| 10,352,826 | B2 | 7/2019 | Fritz et al. | |
| 10,891,876 | B2 | 1/2021 | Fritz et al. | |
| 10,955,313 | B2 | 3/2021 | Hafellner et al. | |
| 11,092,515 | B2 | 8/2021 | Hafellner et al. | |
| 11,125,651 | B2 | 9/2021 | Hafellner et al. | |
| 2007/0214901 | A1 | 9/2007 | Narita et al. | |
| 2012/0176679 | A1 * | 7/2012 | Dondo | B62J 6/20<br>359/549 |
| 2014/0102224 | A1 | 4/2014 | Fritz | |
| 2015/0317917 | A1 | 11/2015 | Fritz et al. | |
| 2016/0054199 | A1 | 2/2016 | Fritz et al. | |
| 2016/0356674 | A1 | 12/2016 | Chien et al. | |
| 2018/0306676 | A1 | 10/2018 | Wimmer | |
| 2019/0219486 | A1 | 7/2019 | Hafellner et al. | |
| 2019/0257717 | A1 | 8/2019 | Hafellner et al. | |
| 2020/0003658 | A1 | 1/2020 | Hafellner et al. | |
| 2021/0215796 | A1 * | 7/2021 | Fischer | G01S 7/521 |

FOREIGN PATENT DOCUMENTS

| | | | |
|---|---|---|---|
| EP | 1734352 | | 12/2006 |
| RU | 2337376 | C1 * | 10/2008 |

OTHER PUBLICATIONS

European Patent Office; Machine patent translation; DE 2929814A1; Jan. 29, 1981.

Lemmen, et al; "Evaluation of pedestrian targets for use in autonomous emergency brake system testing; A report from the hamonistion platform 2 dealing with test equipment". 23rd Conference on the Enhancement of the Safety of Vehicles (ESV); 2013; pp. 1-15.

European Patent Office; Machine patent translation; DE 102013113466A1; Jun. 11, 2015.

Belgiovane, et al; "Surrogate Bicycle Design for Millimeter-Wave Automotive Radar Pre-Collision Testing". EEE Transactions on Intelligent Transportation Systems; Sep. 2017; vol. 18; No. 9; pp. 2413-2422.

European Patent Office; International Search Report; PCT/EP2020/051023; Apr. 8, 2020; Netherlands.

English Translation of Certain Non-English Language References Cited in Information Disclosure Statement of Jul. 15, 2021.

* cited by examiner

DUMMY APPARATUS WITH MOVABLE RADAR REFLECTING ELEMENTS FOR TESTING DRIVER ASSISTANCE SYSTEMS

CROSS REFERENCE TO RELATED APPLICATIONS

This application is a national US phase of PCT/EP2020/051023 which claims the benefit of the filing date of the German Patent Application No. 10 2019 101 100.0 filed 16 Jan. 2019, the disclosure of which is hereby incorporated herein by reference.

TECHNICAL FIELD

Embodiments of the disclosure relate to a dummy device for testing driver assistance systems and a method of operating a dummy device.

Technological Background

In various tests of modern driver assistance systems, dummies are utilized, such as pedestrian dummies, motorcycle dummies or car dummies. Such dummies resemble in at least one aspect or one characteristic the object which shall be simulated by the dummies. For example, the dummies may have a similar geometrical shape or a similar size as the objects to be simulated.

Collisions or situations close to collisions cannot be avoided in many tests of driver assistance systems and are frequently even desired to examine extreme situations or to train driver assistance systems. Possible costs or even body injuries which are caused by collisions shall be kept as low as possible. Correspondingly, dummies have to be manufactured in a cost-efficient way and have to be repaired in a simple and cost-efficient way also after a serious mechanical impact. At the same time, dummies shall model the objects which they simulate as realistically as possible.

SUMMARY

There may be a need to provide a dummy device for tests of driver assistance systems which, also after a mechanical impact, is suitable for a repeated use in tests for driver assistance systems.

A dummy device for performing tests for driver assistance systems and a method of operating a dummy device according to the independent claims are provided.

According to a first embodiment of the present disclosure, a dummy device for performing tests for driver assistance systems is described. The dummy device comprises a base body with a simulation region, wherein the base body depicts an object to be simulated and the simulation region depicts a movable part of the object to be simulated. In addition, the dummy device comprises at least one simulation element which is arranged at the simulation region. The simulation element is configured to reflect and/or to emit signals, in particular signal waves, such that a motion of the movable part of the object to be simulated is simulatable.

According to a further embodiment of the present disclosure, a method of operating a dummy device is described. The method comprises providing a dummy device, wherein the dummy device comprises a base body with a simulation region and at least one simulation element which is arranged at the simulation region and is movable relatively to the simulation region. In addition, the method comprises moving the simulation element relatively to the simulation region, such that a motion of a movable part of an object to be simulated is simulated, wherein the simulation region depicts the movable part of the object to be simulated. The simulation element is configured to reflect and/or to emit signals, in particular signal waves.

OVERVIEW OF EMBODIMENTS

A "driver assistance system" is a system which supports the driver of a vehicle, for example a motor vehicle, in vehicle guidance. Driver assistance systems may also be utilized in autonomous vehicles in which the vehicle guidance is completely or almost completely transferred to an autonomous system, for example a system which is supported by artificial intelligence, in particular a corresponding computer software. Driver assistance systems are for example emergency brake assistants, lane change assistants, parking assistants, distance controllers, traffic sign assistants or night vision assistants.

Driver assistance systems may comprise sensors, in particular radar sensors, by which they receive signals from the environment. By means of an evaluation of such received signals, they are capable of recognizing aspects of the environment, in particular characteristics of different objects or object types in the environment. Such characteristics may for example be distances, geometrical dimensions or velocities of objects. Velocities may be determined relatively to the environment, for example relatively to a street, or also relatively to a vehicle with the driver assistance system. Objects may have a total velocity or a center of gravity velocity, however, parts of the object may also be movable in an arbitrary manner relatively to each other and relatively to the center of gravity motion. Driver assistance systems may also comprise transmitters of signals which are changed by the environment in a characteristic manner, in order to be subsequently at least partially received by the sensors, for example transmitters of radar waves.

In a test of a driver assistance system, a vehicle may be equipped with the driver assistance system. Such an equipped vehicle may be confronted with predetermined situations on a test track, wherein the reaction of the driver assistance system on a predetermined situation is observed and evaluated according to pregiven criteria. Driver assistance systems may also be tested without being installed in a vehicle.

An "object to be simulated" may be each object which shall be recognizable by the driver assistance system when using a driver assistance system, for example in traffic. In particular, an object to be simulated may be perceivable or recognizable for the sensors of the driver assistance system. An object to be simulated may be located in the environment of the vehicle in which the driver assistance system is installed. For example, the object to be simulated may be a further vehicle, in particular a motor vehicle, a motorcycle, a tractor, a rail vehicle, a plane or a bicycle, or a person, in particular a pedestrian or a playing child, or an animal, in particular a wild boar, a deer or a moose. The object to be simulated may be movable with respect to the environment, but may also be unmoved or unmovable with respect to the environment.

A "movable part" of the object to be simulated may be each part of the object which is at least partially movable with respect to other parts of the object to be simulated. In particular, such a movable part may be rotatably movable around one or more pivoting points, for example by a hinge or by an axis. The movable part may also be translatably movable along a direction which is pregiven by the object to be simulated. The translatory motion may be determined by a rail at the object to be simulated, for example. In general, the movable part may be arbitrarily movable, in particular also by a combination of rotational motions and translatory motions. The movable part may represent a part of the object to be simulated which especially strongly reflects a signal wave, in particular a radar wave, in particular in a stronger, an equal or a weaker manner than others, in particular not movable regions of the object to be simulated. The movable part may be a part which comprises a motion profile which is characteristic for the object to be simulated or for an object type to be simulated, for example a wheel of a vehicle or an extremity of a human. This characteristic motion profile may generate a characteristic signal echo by which the object to be simulated or an object type to be simulated may be identified or recognized.

A "base body" of the dummy device may depict or simulate an object to be simulated. In this context, "depicting" or "simulating" may mean that the base body and the object to be simulated are similar in certain properties or are substantially matching, for example in the shape or the geometrical dimensions. In particular, the base body and the object to be simulated may match in such properties which are perceivable or recognizable for sensors of driver assistance systems. For example, a signal echo, in particular a characteristic frequency shift which is caused by a reflection of a signal, may be similar.

The "simulation region" of the base body is a region of the base body which at least partially depicts or simulates the movable part of the object to be simulated. In particular, the simulation region may be arranged with respect to the base body at a similar geometrical position as the movable part of the object to be simulated with respect to the object to be simulated. It may also comprise similar geometrical dimensions with respect to the base body as the movable part of the object to be simulated with respect to the object to be simulated. The simulation region may depict a wheel or a human extremity, for example.

The simulation region may be configured to optically simulate the movable part of the object to be simulated, for example for an optical recording device, for example a photo camera or a video camera. For this purpose, the simulation region may comprise a surface on which a view of the movable part is printed. For example, it may comprise a printed foam material, a printed paperboard and/or a printed paper. The simulation region may be statically arranged at the base body. It may correspond in shape and/or size to the entire movable part. It may also correspond in shape and/or size only to a signal reflecting, in particular radar reflecting, region of the movable part, for example to the wheel rim of a wheel.

The "simulation element" may be movably arranged at the simulation region. The simulation element, such as the simulation region, may depict or simulate the movable part of the object to be simulated. In particular, the simulation element may depict a motion state or a motion sequence of the movable part of the object to be simulated. In particular, the motion state of the simulation element relatively to the simulation region and/or the base body may depict the motion state of the movable part of the object to be simulated relatively to the object to be simulated. For this purpose, certain regions, in particular signal reflecting regions, of the simulation element may move with the same velocity as other regions, in particular signal reflecting regions, of the movable part of the object to be simulated. The velocities may slightly deviate, for example up to 5 percent, up to 10 percent, or up to 20 percent.

For example, the simulation element is drivable by an actuator, e.g. an electric motor, in particular a linear motor in case of translatory motions of the simulation element. The drive may be performed in an electromagnetic, electrical, mechanical, hydraulic, pneumatic, or manual manner. Amongst others, coils or lifting solenoids may be used for the drive. A control unit may control the motion and the velocity of the motion of the simulation element, in order to correspondingly obtain the desired reflection characteristic of the simulation element.

Simulation elements are configured to reflect and/or to emit signal waves. For example, they may reflect signal waves such that the reflected signal, in particular the difference between incident and reflected signal, is characteristic for the object to be simulated, in particular for the movable part of the object to be simulated. The simulation elements may also emit signal waves, such that the emitted signal is characteristic for the object to be simulated, in particular for the movable part of the object to be simulated. Correspondingly, for example, the simulation element may comprise a transmitting unit, for example an antenna, for transmitting signal waves, for example radar waves. In particular when the simulation element comprises an emitter, the simulation element may also be statically arranged at the simulation region.

Signal waves may be each type of signals which are formed in a wave-shaped manner, which in particular comprise a periodic oscillation which is spatially propagating, or may at least be assembled from wave-shaped signals. Signal waves may be transverse or longitudinal waves. They may be mechanical waves bound to a medium, or waves which also propagate in a vacuum. For example, signal waves may be electromagnetic or acoustic waves, in particular radio waves, microwaves, light, x-ray, or radar waves. Signal waves may also be laser beams or lidar waves, for example, in particular laser pulses. In principle, each signal shape is representable by overlaying or superposition of waves, for example square wave signals. The term "signal" also includes such information carriers which are not necessarily formed in a wave-shaped manner.

By the dummy device according to embodiments of the disclosure, the function of a driver assistance system may be tested in a realistic manner. In particular, the dummy device according to embodiments of the disclosure may depict real objects, for example in traffic, in a realistic manner, in particular depict such that they are recognized by driver assistance systems as real objects of a certain type. For example, signal waves which are reflected and/or emitted by the simulation element may contain an information about the motion state of the simulation element. This motion state or a corresponding motion sequence may be characteristic for a real object to be simulated, in particular for a movable part of the real object. Correspondingly, the signal waves which are reflected and/or emitted by the simulation element may be characteristic for signal waves which are reflected and/or emitted by an object to be simulated, in particular for signal waves which are reflected and/or emitted by a movable part of the object. Due to the described similarity of the motion profiles and the resulting similarity of the reflected and/or emitted signal waves, a real object for a driver assistance system can be simulated by the dummy device in a suitable manner.

For example, the simulation element differs in its geometrical shape and size from the movable part of the object to be simulated and from the simulation region of the base body, wherein due to the motion of the simulation element, the reflections of the signal waves are characteristic for the object to be simulated, in particular for the movable part of the object to be simulated. Thus, the simulation element may comprise a more robust and, if necessary, smaller configuration than the part of the object to be simulated, for example. Thus, not the entire simulation region of the base body, such as a wheel simulation of the dummy device, has to move, but only the simulation element, to reproduce a characteristic signal echo for a characteristic motion profile of the part of the object to be simulated.

The described relation between motion state and the reflected and/or emitted signal waves is characterized by the so-called Doppler effect. According to the Doppler effect, the frequency or wavelength of a wave changes in case of a relative motion between a transmitter and a receiver of the wave, in particular when the transmitter and the receiver are moving towards each other or moving away from each other. The Doppler effect may also depend on the velocity of a carrier medium of the wave.

In case of a reflection at an object, the Doppler effect occurs twice, firstly due to the relative motion between the transmitter and the reflecting object, and secondly due to the relative motion between the reflecting object and the receiver. In contrast, in case of an emission, the Doppler effect occurs only due to the relative motion between a source and the receiver.

The so-called Micro-Doppler effect is based on the same physical principles as the Doppler effect. By the Micro-Doppler effect, relative motions between different parts of an object are resolved. In particular, relative motions of different smaller parts of an object may be resolved with respect to a larger part of the object. The amplitude or intensity of the waves which are reflected and/or emitted by the smaller parts may then be smaller than the amplitude or the intensity of the wave which is reflected and/or emitted by the large part. For example, Micro-Doppler effects may be caused by the motion of the wheels of a truck, in particular of the wheel rims, or by the motion of engines at an aircraft.

In particular the Micro-Doppler effect enables one to identify different objects or object types by means of characteristic internal motions between different constituents of an object, wherein in particular the frequency distribution of a reflected and/or emitted signal is indicative for these characteristic motions. A suitable dummy device for testing driver assistance systems may thus be realized by the dummy device reproducing or simulating the frequency distribution of a certain object or object type.

At the same time, such a dummy device may be manufactured and repaired with much lower effort than comparable real objects, such as motorcycles or cars. For example, such a dummy device may be manufactured from cheap materials, such as from foam or plastic materials. It may only roughly reproduce the contours of the object to be simulated, without comprising the full complexity of the different components of the real object.

According to a further exemplary embodiment, the simulation element is movable relatively to the simulation region. This may be advantageous to simulate a movable part of an object to be simulated.

According to a further exemplary embodiment, the simulation element comprises a retroreflecting element, in particular a triple mirror or a triple prisma. A retroreflecting element may be an element at which incident signal waves, substantially independently from the incidence direction and the orientation of the retroreflecting element, are reflected back substantially along the incidence direction. Such a back-reflection may be limited to a certain angle range of the incidence angles.

A triple mirror is an example of a retroreflecting element. At a triple mirror, three reflecting or specular surfaces are arranged such that the surfaces respectively comprise an angle of 90° with respect to each other. Other angles are also possible. For example, a triple mirror is a concave region whose surface is made of three triangles which form respectively an angle of 90° at a corner at which all three triangles are in contact. In order to reflect radar waves, the reflecting surfaces may be made of a metal, for example, in particular made of sheet metal. A triple prisma is a further example of a retroreflecting element. Such a triple prisma acts analogically to a triple mirror but comprises an additional medium in the concave region which is at least partially transparent for the signal waves. Moreover, for example lens-shaped embodiments of retroreflecting elements are possible.

Attaching retroreflecting elements at the simulation element has the advantage that incident signal waves may be radiated back to the direction of the signal source. Thus, a signal source and a sensor for evaluating the reflected radiation may be arranged in close vicinity with respect to each other in the driver assistance system. In addition, the relation between the intensity of the signal waves perceived by the sensor compared to the intensity of the signal waves emitted from the source may be enlarged. For example, a triple mirror with dimensions in the order of approximately 10 cm may cause a similar radar echo as a real truck without retroreflecting elements.

According to a further exemplary embodiment, the simulation element comprises a surface which comprises a concave region. Such a concave, i.e. inwardly curved, region may be suitable to reflect a signal wave with an intensity as high as possible in the incidence direction. Such a concave region may form a triple mirror, for example.

According to a further exemplary embodiment, the simulation element comprises a further surface which comprises a convex region. The surface and the further surface may be facing each other. A convex, i.e. outwardly curved, region may be suitable to reflect a signal wave with an intensity as low as possible in the incidence direction, since the incident signal waves are correspondingly deflected by the surfaces of the convex region. Convex and concave surface regions of the simulation element may be used to form especially strongly reflecting and especially weakly reflecting surface regions. For example, plate-like parts of the simulation element may be configured such that on a first main surface of the plate, a concave region is formed which, due to the small thickness of the plate, forms a corresponding convex region on a second main surface of the plate, wherein the second main surface is facing the first main surface.

According to a further exemplary embodiment, the simulation element comprises a surface and a further surface which is facing the surface, wherein the surface and the further surface are substantially planar. Forming no concave or convex regions on the surfaces has the advantage that such surfaces have a same or similar reflection behavior. For example, plate-like parts of the simulation element may be configured such that two opposing main surfaces are planar and have a same or similar reflection behavior.

According to a further exemplary embodiment, the simulation element comprises a radar reflecting element and the signals are radar waves. For example, the radar reflecting element may be a radar retroreflecting element, in particular a radar reflecting triple mirror. For example, the mirror surfaces may comprise a metal, e.g. sheet metal. Using radar reflecting elements is appropriate, since radar sensors are used in many driver assistance systems. Amongst others, this is caused by the fact that radar transmitters and radar receivers are realizable in a cost-efficient manner.

According to a further exemplary embodiment, the simulation element may comprise a retroreflecting element and the part of the simulation element which is different from the retroreflecting element may be configured to reflect and/or emit the signal waves more weakly than the retroreflecting element. Such a configuration contributes to the reflected signal being especially distinct and disturbance-free.

According to a further exemplary embodiment, the simulation element is attached and rotatably mounted to a pivoting point at the base body. The simulation element is configured to perform at least one of a rotational motion and a pendulum motion around the pivoting point. Such a configuration is advantageous to simulate objects at which movable parts are also rotatably mounted, for example at an axis or a hinge. For example, such a movable part may be a wheel of a car, a motorcycle or a bicycle, or may be an extremity of a human or an animal.

According to a further exemplary embodiment, the simulation element comprises a rod-shaped element whose main extension direction runs substantially in a radial direction from the pivoting point and comprises at least one reflecting and/or emitting element, which is attached to the rod-shaped element. The reflecting and/or emitting element may comprise a retroreflecting element and/or may comprise a surface with a concave region. However, the reflecting and/or emitting element may also comprise only planar surfaces which respectively have similar reflection properties. The reflecting and/or emitting element may perform a rotational motion around the pivoting point or may perform an oscillating or pendulum motion, wherein the moving direction around the pivoting point is periodically changing. In such a pendulum motion, the velocity of the reflecting and/or emitting element may change approximately in a sinusoidal-shaped manner, for example. In this way, for example a wheel or an arm, in particular an upper arm, may be simulated which swings forth and back while walking or running.

According to a further exemplary embodiment, the distance in the radial direction between the pivoting point and the reflecting and/or emitting element is smaller than a corresponding spatial extension of the simulation region, in particular smaller than the half extension, in particular smaller than one third of the extension. The corresponding spatial extension may be a diameter of the simulation region. The simulation element may thus be much smaller than the simulation region, wherein the simulation region may have similar dimensions as the movable part of the object to be simulated. Correspondingly, with a relatively low material effort, an object to be simulated may be reproduced.

According to a further exemplary embodiment, the rod-shaped element is configured such that it is rotatable with an angular velocity, such that the reflecting and/or emitting element is substantively movable with the same velocity, i.e. with a deviation of up to 3 or up to 5 percent, for example, as the movable part of the object to be simulated, in particular as a reflecting and/or emitting movable part of the object to be simulated. This may apply in particular when the velocity of the base body corresponds to the velocity of the object to be simulated. Such a configuration may be advantageous, since reflecting and/or emitting parts, in case of the same velocity, generate the same Doppler shift. Therefore, the signal echo of the reflecting and/or emitting element of the dummy device is similar or the same as the signal echo of a reflecting and/or emitting part of the object to be simulated, in particular with respect to frequency shifts which are caused by Doppler effects. The signal echo of the reflecting and/or emitting element of the dummy device may further have a similar intensity as the signal echo of the reflecting and/or emitting part of the object to be simulated, for example with a maximum deviation of a factor ten.

According to a further exemplary embodiment, the rod-shaped element extends from both sides of the pivoting point, wherein the simulation element comprises a second reflecting and/or emitting element, wherein the second reflecting and/or emitting element is attached to the rod-shaped element. The reflecting and/or emitting element and the second reflecting and/or emitting element are attached on opposing sides of the pivoting point. The second reflecting and/or emitting element in turn may be a retroreflecting element. The second reflecting and/or emitting element may be arranged with the same distance to the pivoting point as the reflecting and/or emitting element, such that the both elements move with the same velocity in terms of magnitude. In this way, the signal which is reflected and/or emitted from the simulation element may be amplified, with a suitable configuration substantially doubled. By further rod-shaped elements with corresponding reflecting and/or emitting elements, the reflected and/or emitted signal may be further amplified.

According to a further exemplary embodiment, the simulation element comprises a disk which is rotatably mounted at the pivoting point, and comprises at least one reflecting and/or emitting element which is attached to the circumference of the disk. The reflecting and/or emitting element may be a retroreflecting element, for example, in particular a triple mirror or a triple prisma, may be a concave region of a reflecting surface or a planar reflecting surface. The disk may either be massive or may comprise one or more holes. It may be formed with the shape of a wheel with or without a spoke. In this way, for example a wheel, in particular a rotating motion of the wheel, and a signal echo of the wheel may be simulated in a suitable manner. The disk may be a plastic disk, in particular a thin plastic disk.

According to a further exemplary embodiment, the reflecting and/or emitting element is a metallic element, in particular a metallic tape. Multiple metallic elements may be attached to the circumference of the disk, for example glued. For example, 20 to 30 metallic tapes may be distributed on the circumference of the disk with same distances. Metallic elements may also be attached at the rod-shaped elements or at arbitrary other shapes of simulation elements. Such an arrangement may be realized especially simply and cost-efficiently.

According to a further exemplary embodiment, the simulation element comprises at least one further reflecting and/or emitting element, wherein the reflecting and/or emitting element and the further reflecting and/or emitting element respectively comprise a surface and respectively a further surface which is facing the surface, wherein the surface is configured to reflect and/or emit the signals, in particular the signal waves, more strongly than the further surface, wherein the surface of the reflecting and/or emitting element and the surface of the further reflecting and/or emitting element along the circumference of the disk are pointing in opposite directions.

Such an arrangement may be advantageous, since signal waves are likewise reflected in both possible running directions of the wheel. In particular, the signal echo may be the same for opposite viewing directions on the wheel in case of the same relative velocity to the transmitter and the receiver. Moreover, signal waves are not only reflected either by a top side of the wheel or by a bottom side, i.e. a side which is resting on the street, of the wheel. This may also be advantageous insofar as the velocity of the wheel at the point which is resting on the street is approximately zero.

According to a further exemplary embodiment, the simulation element comprises a reflecting and/or emitting element and a further reflecting and/or emitting element, wherein the reflecting and/or emitting element and the further reflecting and/or emitting element respectively comprise a surface and respectively a further surface which is facing the surface, wherein the surface is configured to reflect and/or to emit the signals, in particular the signal waves, more strongly than the further surface, wherein the surface of the reflecting and/or emitting element and the surface of the further reflecting and/or emitting element with respect to a rotation of the simulation element are pointing in opposite directions. The advantages are analog to the previously described embodiment.

According to a further exemplary embodiment, the reflecting and/or emitting element and the further reflecting and/or emitting element are alternatingly attached along the circumference. Therefrom it results, amongst others, that there is a similar number of both types of elements. Correspondingly, from opposite viewing directions on the wheel in case of the same motion state of the wheel with respect to the transmitter and the receiver, a similar signal echo results. This may be advantageous for the identification of different object types. The effect may be even further enhanced by arranging the elements with same distances with respect to each other on the circumference and/or by arranging elements of respectively the same type or of respectively different types at opposite points of the circumference.

According to a further exemplary embodiment, the diameter $d_s$ of the disk is smaller than the diameter $d_r$ of the simulation region, in particular smaller than ½ $d_r$. The diameter $d_s$ may also be smaller than ⅔ $d_r$, in particular smaller than ⅓ $d_r$, in particular smaller than ¼ $d_r$, in particular smaller than 1/10 $d_r$. Thus, the simulation element may be significantly smaller than the simulation region, wherein the simulation region may have similar dimensions as the movable part of the object to be simulated. Correspondingly, with a relatively low material effort, an object to be simulated may be reproduced. When a wheel of the object to be simulated is reproduced by the disk, a small diameter of the disk may have the advantage that the disk shows a lower wear and less signs of wear than a wheel to be simulated, for example since the disk does not touch the ground over which the dummy device moves.

According to a further exemplary embodiment, the geometric dimensions of a simulation element are smaller, in particular smaller than half of the size, than the dimensions of the simulation region. The advantages are analog to the previously described exemplary embodiment.

According to a further exemplary embodiment, the diameter of the simulation element is smaller than a diameter of the movable part of the object to be simulated and/or smaller than a diameter of the simulation region, in particular smaller than 5%, in particular smaller than ⅘, in particular smaller than ⅔, in particular smaller than ½ of the diameter of the movable part of the object to be simulated and/or the diameter of the simulation region. The diameter of the movable part of the object to be simulated may be a diameter of the entire movable part or only of a signal reflecting region of the movable part. The advantages are analog to the previously described embodiments again.

According to a further exemplary embodiment, the disk is configured such that it is rotatable with an angular velocity, such that the reflecting and/or emitting element is movable substantially, i.e. for example with a deviation of up to 3 or up to 5 percent, with the same velocity as the movable part of the object to be simulated, in particular as a reflecting and/or emitting movable part of the object to be simulated. This may apply in particular when the velocity of the base body corresponds to the velocity of the object to be simulated. This may be advantageous, since reflecting and/or emitting parts at the same velocity generate the same Doppler shift. Thus, the signal echo of the reflecting and/or emitting element of the dummy device is similar or the same as the signal echo of a reflecting and/or emitting part of the object to be simulated, in particular with respect to frequency shifts which are caused by Doppler effects. Correspondingly, the dummy device may simulate the Doppler echo of an object type to be simulated in a suitable manner. The signal echo of the reflecting and/or emitting element of the dummy device may further have a similar intensity as the signal echo of the reflecting and/or emitting part of the object to be simulated, for example with a maximum deviation about a factor ten.

According to a further exemplary embodiment, the simulation element comprises a rod-shaped element and comprises at least one reflecting and/or emitting element which is attached to an end of the rod-shaped element. Such an arrangement on the one hand is very simple, but may on the other hand depict a plurality of different movable parts of different objects to be simulated, for example wheels or also elongated elements which are attached at hinges, for example arms or legs.

According to a further exemplary embodiment, the rod-shaped element is configured to perform a substantially linear motion, in particular substantially along the main extension axis of the rod-shaped element. Such a linear motion may be advantageous to simulate a wheel by simple means, for example. The rod-shaped element may be arranged in the center of the simulation region, wherein the simulation region with respect to the base body may correspond approximately to the dimensions and the position of a wheel of the object to be simulated. An arrangement in the center of the simulation region may take into consideration the symmetry of the wheel to be simulated.

According to a further exemplary embodiment, a reflecting and/or emitting element of the simulation element is configured to perform a linear motion with respect to the simulation region and/or the base body. The reflecting and/or emitting element may be movable with a velocity which corresponds to a velocity component of the movable part of the object to be simulated. For this purpose, the velocity may be changeable over time, for example changeable in a sinus-shaped manner.

According to a further exemplary embodiment, a surface of the reflecting and/or emitting element which comprises a retroreflecting element is aligned substantially perpendicularly to the main extension axis and/or the moving direction of the rod-shaped element. In other words, the normal vector of the retroreflecting surface is aligned substantially in a parallel manner to the main extension axis and/or the moving direction of the rod-shaped element. This may be advantageous, since the Doppler shift may be especially large and clearly pronounced when the retroreflecting surface is pointing in the moving direction.

According to a further exemplary embodiment, the rod-shaped element is attached to the simulation region such that the rod-shaped element is movable, in particular translatably movable, with a velocity which substantially corresponds to a velocity component of the movable part of the object to be simulated. This may apply in particular when the velocity of the base body corresponds to the velocity of the object to be simulated. A velocity component in a determined direction results by a (perpendicular) projection of a velocity vector on this determined direction.

The described configuration may be advantageous, since reflecting and/or emitting parts at the same velocity generate the same Doppler shift. Therefore, the signal echo of the reflecting and/or emitting element of the dummy device is similar or the same as the signal echo of a reflecting and/or emitting part of the object to be simulated, at least with respect to frequency shifts which are caused by Doppler shifts. Correspondingly, the dummy device may simulate the Doppler echo of an object or an object type to be simulated in a suitable manner.

For example, the linear motion of the rod-shaped element and of the reflecting and/or emitting element may simulate the alternating forth and backwards motion of a point on or at a wheel and/or a wheel rim, projected on a direction which is an analog to the main extension direction of the rod-shaped element. The main extension direction of the rod-shaped element may be substantially parallel to a surface, for example a road, on which the dummy device moves. The main extension direction may be aligned along the base body or parallel to the base body, in particular along the simulation region or parallel to the simulation region.

According to a further exemplary embodiment, the velocity of the rod-shaped element over time is changeable in a sinusoidal-shaped manner. This may be advantageous to reproduce pendulum motions which frequently may be at least approximately characterized by a sinusoidal-shaped velocity distribution. Moreover, by a sinusoidal-shaped velocity distribution, the motion of a wheel may be reproduced, since the previously described forth and backwards motion of a point on or at a wheel comprises a sinusoidal-shaped velocity distribution. In this way, the signal echo of a wheel can be simulated in an especially simple and efficient manner.

According to a further exemplary embodiment, the base body may be configured to simulate at least one of a car, a motorcycle, a bicycle, a human, in particular a pedestrian, and an animal, in particular a wild boar, a moose or a deer.

According to a further exemplary embodiment, the simulation region may be configured to simulate at least one of a tight, a knee, a shank, a foot, an upper arm, an elbow, a hand, a paw, a wheel and a wheel rim. In particular, the simulation region may be configured to reproduce a strongly reflecting and/or emitting movable part of an object to be simulated, wherein the strongly reflecting and/or emitting part reflects and/or emits more strongly than other regions of the object to be simulated. For example, the simulation region may be a wheel rim of a wheel which reflects radar waves especially well.

According to a further exemplary embodiment, a test system comprises a dummy device according to embodiments of the disclosure. Moreover, the test system comprises a transmitter which is configured to transmit the signals, in particular the signal waves, wherein the simulation element of the dummy device is configured to reflect the transmitted signal. Furthermore, the test system comprises a receiver which is configured to receive the reflected signal, and a signal processing unit which is configured to analyze the received signal. In particular, the transmitter and the receiver may be arranged in close proximity to each other. They may be arranged at the same device, in particular a test vehicle. Thus, transmitter and receiver may move with the same velocity. Moreover, transmitter and receiver may be aligned substantially in the same direction to enable the receiver to receive waves, in particular retroreflected waves which are transmitted by the transmitter and reflected at an object.

The test system further comprises a control unit, for example, which may transmit corresponding control signals to the simulation element and the actuator of the simulation element, respectively. Thus, the control unit controls the motion and the velocity of the motion of the simulation element, to correspondingly receive the desired reflection characteristic of the simulation element. The velocity of the simulation element may be controllable in dependence from the velocity of the base body relatively to the environment, for example to a street.

The signal processing unit may analyze the received waves with respect to an angle, respectively direction, from which the reflected waves are received, and/or with respect to the distance of objects which results from the time shift between sending and receiving signals and from the signal velocity. Furthermore, the motion of an object may be determined from multiple subsequent distance measurements. Finally, the frequency shift of a reflected signal may provide information about the relative motion between the transmitter and the receiver.

According to a further exemplary embodiment, a frequency distribution of the reflected signal comprises an information about a motion of the base body and/or a motion of the simulation element. In particular, this information may result from a frequency shift of the signal waves in case of a reflection at a moving object, wherein the frequency shift is caused by the Doppler effect. The frequency shift may be time-depending.

According to a further exemplary embodiment, the base body and the movable simulation element are configured and movable such that the frequency distribution of the reflected signal is indicative for a further frequency distribution of a further reflected signal which is reflectable by the object to be simulated, wherein the frequency distribution is definable by at least one of the following parameters: a width of the frequency distribution, a period duration of a temporal variation of the frequency distribution, an intensity of the frequency distribution, and an amplitude and/or a frequency of at least one maximum of the frequency distribution. In particular, this may apply when the velocity of the base body corresponds to the velocity of the object to be simulated.

In other words, the frequency distribution of the signal which is reflected by the dummy device may correspond to a further frequency distribution which is reflected at the object to be simulated. In particular, the frequency distribution of the signal which is reflected by the simulation element may correspond to a frequency distribution which is reflected at the movable part of the object. In particular, the frequency distribution of the signal which is reflected by a reflecting and/or emitting element of the simulation element may correspond to a frequency distribution which is reflected by a reflecting and/or emitting movable part of the object. In this context, a correspondence may mean a matching in at least one of the previously mentioned properties of frequency distributions. This matching may be caused by analogically occurring Doppler effects, in particular analogically occurring Micro-Doppler effects. In this context, matching may approximately denote that the maxima in terms of amplitude and/or position to not deviate from each other by more than 5 percent, in particular not by more than 10 percent, in particular not by more than 50 percent, for example.

According to a further exemplary embodiment, the signal processing unit is configured to identify an object and/or an object type by means of particular properties of the frequency distribution which is received at the receiver. In particular, these properties may be the properties which are mentioned in connection with the previous exemplary embodiment.

According to a further aspect of the present disclosure, a simulation element for a dummy device for performing tests for driver assistance systems is described. The simulation element is configured to reflect and/or to emit signals such that a motion of a movable part of an object to be simulated is simulatable. Furthermore, the simulation element is attachable to a simulation region of a base body of the dummy device, wherein the base body depicts the object to be simulated, and the simulation region depicts the movable part of the object to be simulated.

According to a further exemplary embodiment, the simulation element encompasses an energy supply unit and/or a control unit to control the motion of the simulation element. By this measure, an autarkic, autonomous unit is provided which is usable in a modular manner.

It is noted that the here described embodiments merely represent a limited selection of possible embodiment variants of the disclosure. Therefore, it is possible to combine the features of single embodiments with each other in a suitable manner, such that a plurality of different embodiments is to be considered as obviously disclosed for the skilled person by the here explicit embodiments variants. In particular, some embodiments of the invention are described with device claims and other embodiments of the invention with method claims. However, when reading this application, it is immediately clear for the skilled person that, unless explicitly otherwise specified, in addition to a combination of features which belong to one type of inventive subject matter, also an arbitrary combination of features is possible which belong to different types of inventive subject matters.

BRIEF DESCRIPTION OF THE DRAWINGS

In the following, for further explanation and for a better understanding of the embodiments of the present disclosure, embodiments are described in more detail with reference to the accompanied drawings. It is shown by.

DETAILED DESCRIPTION OF ILLUSTRATED EMBODIMENTS

Same or similar components in different figures are provided with the same reference numbers. The illustrations in the figures are schematically presented.

Figure 1:
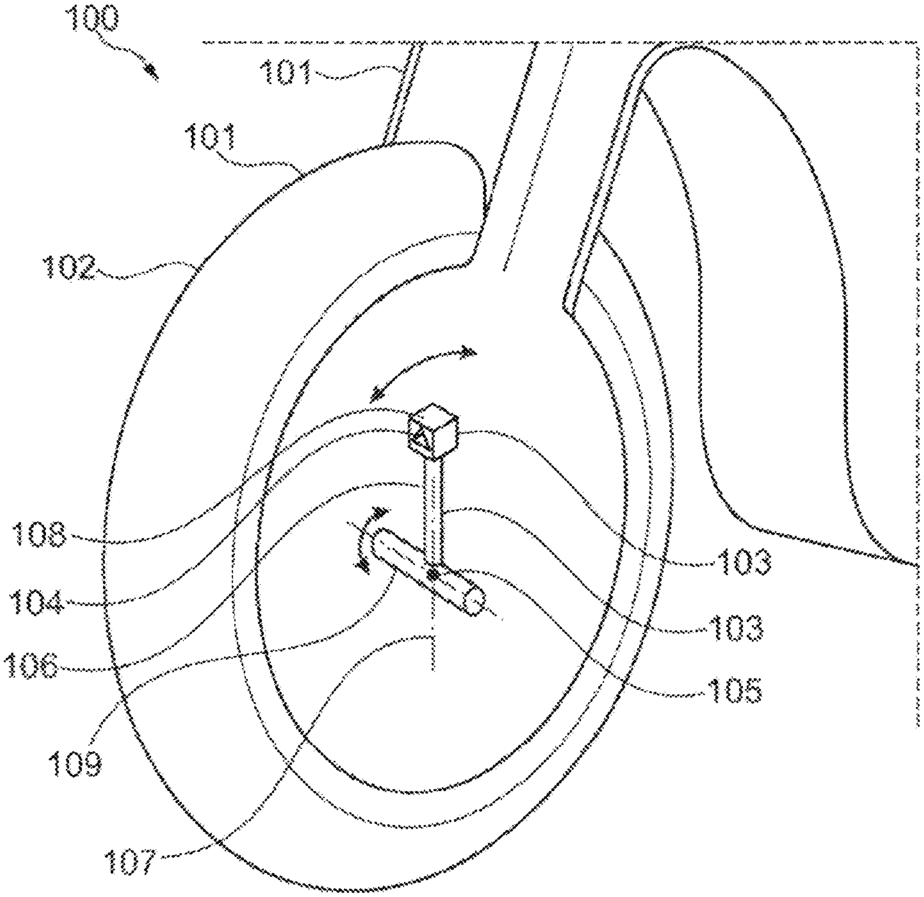
FIG. 1 is a perspective illustration of a section of a dummy device according to an exemplary embodiment of the present disclosure.

FIG. 1 shows a dummy device 100 for performing tests for driver assistance systems according to an exemplary embodiment of the present disclosure. The dummy device 100 comprises a base body 101 with a simulation region 102, wherein the base body depicts an object to be simulated and the simulation region 102 depicts a movable part of the object to be simulated. Moreover, the dummy device 100 comprises at least one simulation element 103 which is arranged at the simulation region 102 and which is movable relatively to the simulation region 102. The simulation element 103 is configured to reflect and/or emit signal waves 704, 705 (see FIG. 7) such that a motion of the movable part of the object to be simulated is simulatable.

In the embodiment in FIG. 1, the dummy device 101 is a motorcycle dummy which is only partially shown. Correspondingly, the base body 101 is a motorcycle base body. The motorcycle base body simulates a motorcycle. Therefore, the base body 101 in its geometrical dimensions may approximately correspond to an actual motorcycle. The base body 101 may be manufactured from other materials than an actual motorcycle and may possess a less complex structure than an actual motorcycle.

The base body 101 comprises a simulation region 102 which simulates or reproduces a movable element of the motorcycle. In FIG. 1, the simulation region 102 is a region of the base body 101 which depicts the front wheel of the motorcycle and in this case is an analog in its dimensions and/or its position with respect to the base body 101 to a front wheel. The simulation region 102 may be only an analog to the wheel rim of the front wheel.

The simulation element 103 according to the exemplary embodiment in FIG. 1 is arranged at the simulation region 102 and is movable relatively to the simulation region 102, in particular also movable relatively to the base body 101 which comprises the simulation region 102. The simulation element 103 according to the embodiment in FIG. 1 comprises a rod-shaped element 106 which is attached and rotatably mounted to a pivoting point 105 at the simulation region 102. The main extension direction 107 of the rod-shaped element runs substantially in the radial direction from the pivoting point 105, wherein the rod-shaped element extends only on one side of the pivoting point. The simulation element 102 may further comprise a further rod-shaped element 109 which is connected to the rod-shaped element 106, extends perpendicularly to the rod-shaped element 106, and whose main extension direction runs along the rotation axis of the simulation element and forms the rotation axis of the simulation element, respectively.

A reflecting and/or emitting element 108 is attached to the end of the rod-shaped element 106 which is not connected to the further rod-shaped element 109. The reflecting and/or emitting element 108 may comprise a retroreflecting element 104. A surface which comprises the retroreflecting element 104 may be arranged such that the normal vector of the surface is pointing to a possible rotation direction. An angle range in which the retroreflecting element 104 reflects with a large or maximum intensity may be symmetrically arranged around the possible rotation direction. Furthermore, the reflecting and/or emitting element 108 may comprise a further retroreflecting element which is arranged at a further surface which is facing the surface with the retroreflecting element 104.

Figure 2:
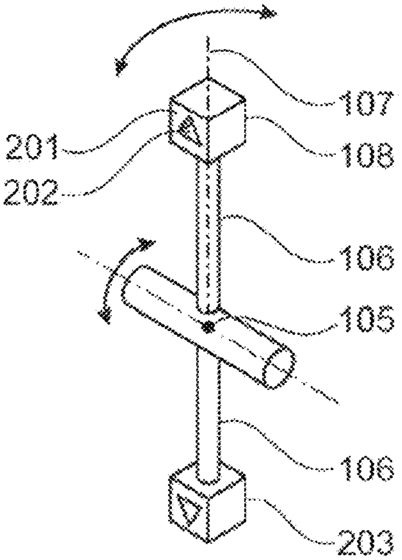
FIG. 2 is a perspective illustration of a simulation element of a dummy device according to an exemplary embodiment of the present disclosure.

FIG. 2 shows an enlarged illustration of the simulation element of FIG. 1, wherein the rod-shaped element 106 extends on both sides of the pivoting point 105. This may but does not have to mean a continuity of the rod-shaped element 106 in the region of the pivoting point 105. The rod-shaped element 106 may also consist of two spatially separated regions which extend to opposite sides of the pivoting point in the same direction.

The reflecting and/or emitting element 108 may comprise a surface 201 which comprises a concave region 202. For example, such a concave region 202 may form a retroreflecting element, in particular a triple mirror. The surface 201 may be aligned in a possible moving direction of the reflecting and/or emitting element.

A further reflecting and/or emitting element 203 may be attached at the rod-shaped element 106 such that the reflecting and/or emitting element 108 and the further reflecting and/or emitting element 203 are attached on opposing sides of the pivoting point. The further reflecting and/or emitting element 203 may also comprise at least one surface with a concave region and/or a retroreflecting element. The surface with the concave region and/or the retroreflecting element, such as in the case of the reflecting and/or emitting element 108, may be aligned in a possible moving direction or rotation direction of the further reflecting and/or emitting element 203.

Figure 3:
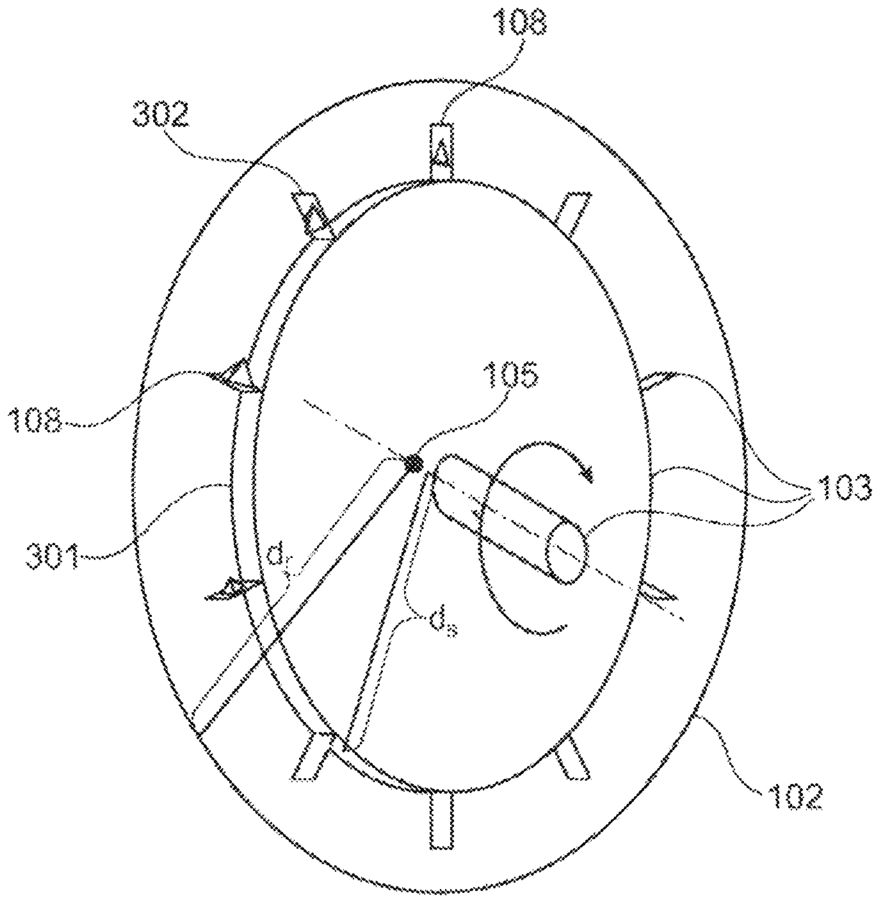
FIG. 3 is a perspective illustration of a simulation region and a simulation element according to an exemplary embodiment of the present disclosure.

FIG. 3 shows a simulation region 102 and a simulation element 103 according to an exemplary embodiment. The simulation region 102 may be disk-shaped and may depict the wheel or the wheel rim of a motorcycle or a motor vehicle, for example. The simulation element 103 may comprise a disk 301 which is attached and rotatably mounted at a pivoting point 105 at the simulation region 102. In particular, the pivoting point 105 may be arranged at least approximately in a center of the simulation region 102 and may be connected to a center of the disk 301, such that the disk 301 and the simulation region 102 are arranged approximately concentrically. The disk may comprise a radius $d_s$. The simulation region 102 may comprise a radius $d_r$, wherein the radius $d_s$, may be smaller than the radius $d_r$, in particular smaller than ⅔ $d_r$, in particular smaller than ½ $d_r$, in particular smaller than ⅓ $d_r$, in particular smaller than ¼ $d_r$, in particular smaller than 1/10 $d_r$. The radius $d_s$ may also be as large as or larger than $d_r$. The term “radius” may also be understood in a more general sense than an average extension of a body in different directions.

At or on the circumference of the disk 301, reflecting and/or emitting elements 108 may be arranged. These may be disk-shaped or plate-shaped. Main surfaces of the reflecting and/or emitting elements 108 may be aligned in the moving direction, that is the normal vector of the main surface may be aligned substantially in parallel to the moving direction of the reflecting and/or emitting element 108, in other words in parallel to a direction which runs tangentially to the circumference of the disk 301. Further reflecting and/or emitting elements 302 may be arranged such that they are differently aligned than the reflecting and/or emitting elements 108 with respect to a moving direction or rotating direction.

Figure 4:
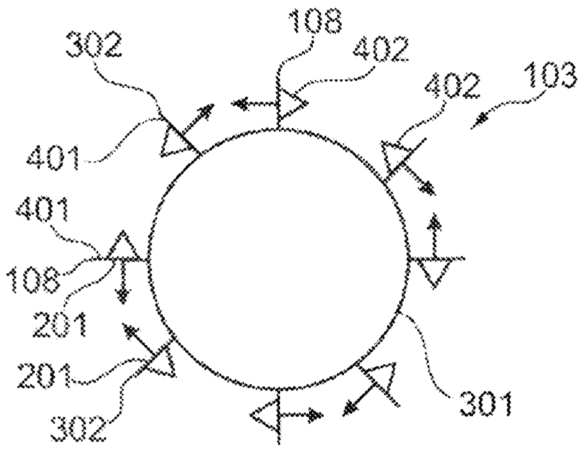
FIG. 4 is a side view of the simulation element of FIG. 3.

FIG. 4 shows a side view of the simulation element 103 of FIG. 3 according to an exemplary embodiment. A plurality of reflecting and/or emitting elements 108 and a plurality of further reflecting and/or emitting elements 302 are arranged at or on the circumference of the disk 301. The reflecting and/or emitting elements 108 and the further reflecting and/or emitting elements 302 respectively comprise a surface 201 with a concave region and a further surface 401 with a convex region 402, wherein for each element, the surface 201 is facing the further surface 401. The surface 201 may be aligned in the circumferential direction of the disk, that is the normal vector of the surface may be substantially parallel to a direction which runs tangentially to the circumference of the disk 301. In the same way, the further surface 401 may be aligned in the circumferential direction of the disk 301. The concave region may be formed as a triple mirror. The convex region 402 may be formed by the backside of the triple mirror. The surface with the concave region may represent a retroreflecting element.

The surfaces 201 of the reflecting and/or emitting elements 108 may be aligned in an opposite direction along the circumference of the disk 301 compared to the surfaces 401 of the further reflecting and/or emitting elements 302. The reflecting and/or emitting elements 108 and the further reflecting and/or emitting elements 302 may be alternatingly arranged along the circumference. They may have substantially a same distance with respect to each other, in particular the distance between adjacent elements may be substantially the same. At opposite positions on or at the circumference of the disk 301, respectively elements of the same type may be arranged, thus respectively either reflecting and/or emitting elements 108 or respectively further reflecting and/or emitting elements 302. At opposite positions on or at the circumference of the disk 301, also respectively elements of a different type may be arranged, thus respectively a reflecting and/or emitting element 108 opposite to a further reflecting and/or emitting element 302.

Figure 5:
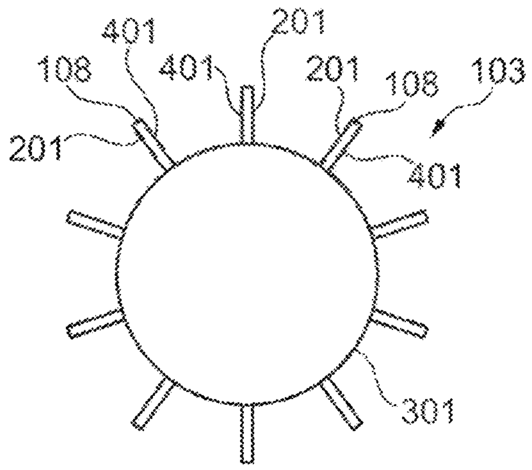
FIG. 5 is a side view of a simulation element according to an exemplary embodiment of the present disclosure.

FIG. 5 shows a side view of a simulation element 103 according to an exemplary embodiment. The simulation element 103 comprises a disk 301 and a plurality of reflecting and/or emitting elements 108. The reflecting and/or emitting elements 108 are disk-shaped or plate-shaped. Main surfaces 501, 502 of the reflecting and/or emitting elements 108 are aligned in the circumferential direction of the disk 301, i.e. their normal vector is aligned in parallel to the circumference of the disk. Two main surfaces 501, 502 of a reflecting and/or emitting element are respectively facing each other and are aligned in opposite directions. In contrast to the embodiment according to FIG. 4, the main surfaces 501 and 502 are configured similarly. In particular, they comprise a similar reflection behavior.

Figure 6:
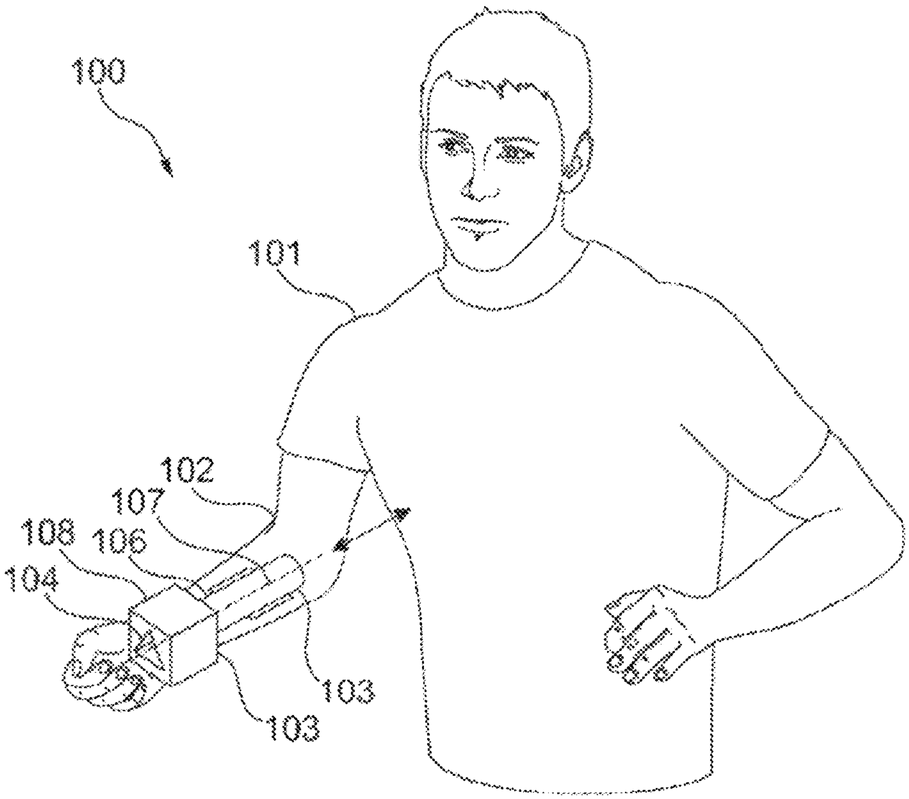
FIG. 6 is a perspective illustration of a section of a dummy device according to an exemplary embodiment of the present disclosure.

FIG. 6 shows a dummy device 100 according to an exemplary embodiment.

The dummy device 100 is a person dummy which is only partially depicted.

Correspondingly, the base body 101 is a person base body. The person base body simulates a person. Therefore, it may correspond in its geometrical dimensions approximately to an actual person, for example a pedestrian, but may be manufactured from other materials than an actual pedestrian and may possess a much less complex structure than an actual pedestrian.

The person base body comprises a simulation region 102 which simulates or depicts a movable element of the person. In FIG. 6, the simulation region 102 is a region of the base body 101 which depicts an upper arm of the person, and which is an analog to an upper arm in view of its dimensions and/or its position with respect to the base body 101. The simulation region in its dimension and its position does not have to match the depicted movable part of an object to be simulated.

The simulation element 103 according to the exemplary embodiment in FIG. 6 is arranged at the simulation region 102 and is movable relatively to the simulation region 102, in particular also movable relatively to the base body 101 which comprises the simulation region 102. The simulation element 103 according to the embodiment of FIG. 6 comprises a rod-shaped element 106 which is configured to perform a substantially linear motion substantially along the main extension axis 107 of the rod-shaped element 106, in particular a linear motion wherein the rod-shaped element 106 moves alternatingly forth and back, in particular moves periodically forth and back. The linear motion of the rod-shaped element may be generated by the motion along a rail, for example.

A reflecting and/or emitting element 108 is attached to an end of the rod-shaped element 106. The reflecting and/or emitting element 108 may comprise a surface with a retroreflecting element 104 and/or with a concave region, wherein the surface is aligned substantially along the main extension axis 107 of the rod-shaped element 106. In other words, a normal vector of the surface is substantially parallel to the main extension axis 107. The motion of the simulation element, in particular of the reflecting and/or emitting element, may simulate the pendulum motion of an upper arm, for example, in particular the pendulum motion of an elbow.

According to an exemplary embodiment, the simulation element 103 of FIG. 6 may also simulate a wheel and/or a wheel rim. The simulation element 103 may be arranged in the center of a simulation region which depicts the wheel and/or the wheel rim. The linear motion of the rod-shaped element 106 and of the reflecting and/or emitting element 108 may simulate the alternating forth and backwards motion of a point on or at the wheel and/or the wheel rim, projected on a direction which is an analog to the main extension direction of the rod-shaped element. For this purpose, the linear motion of the rod-shaped element relatively to the simulation region 102 in particular may comprise a sinusoidal-shaped velocity distribution. Furthermore, the main extension direction of the rod-shaped element may be substantially parallel to a surface, for example a road, on which the dummy device moves. The main extension direction may be aligned along the base body or parallel to the base body, in particular along the simulation region or parallel to the simulation region.

Figure 7:
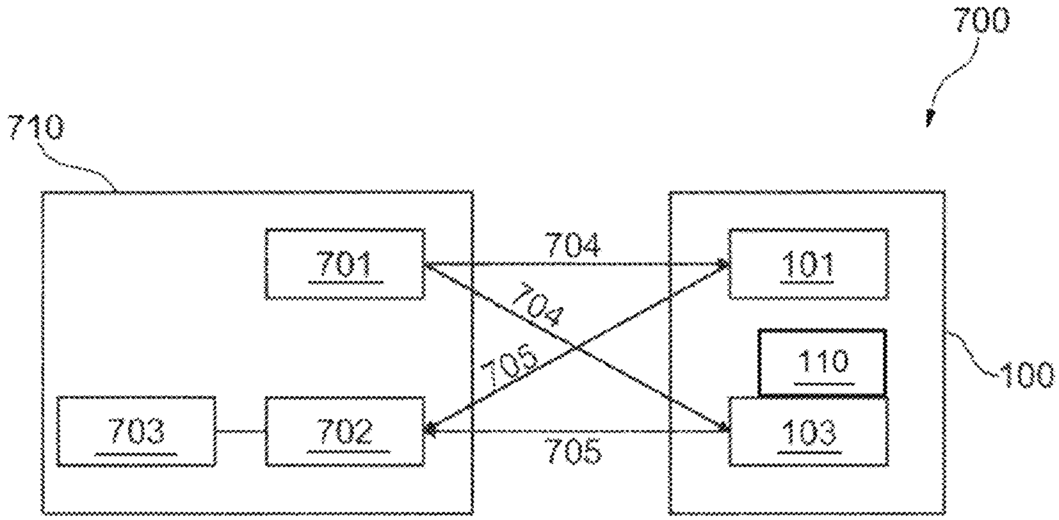
FIG. 7 is a schematic illustration of a test system according to an exemplary embodiment of the present disclosure.

FIG. 7 shows a test system 700 according to an exemplary embodiment. The test system 700 comprises a dummy device 100 according to embodiments of the invention which comprises a base body 101 and a simulation element 103. Moreover, the test system 700 comprises a test unit 710. The test unit comprises a transmitter 701 which is configured to transmit the signal waves 704 to the base body 101 and/or the simulation element 103, wherein the simulation element 103 and/or the base body 101 of the dummy device 100 are configured to reflect the transmitted signal 704. The test unit 710 further comprises a receiver 702 which is configured to receive the reflected signal 705, and the test unit 710 comprises a signal processing unit 703 which is configured to analyze the received signal. A frequency distribution of the reflected signal 705, in particular a difference between the frequency distribution of the transmitted signal 704 and the frequency distribution of the received signal, may comprise an information about a motion of the base body 101 and/or a motion of the simulation element 103 of the dummy device.

For example, the simulation element 103 is drivable by an actuator 110, e.g. an electric motor, in particular a linear motor in case of translatory motions of the simulation element 103. The actuator 110 may be enabled in an electromagnetic, electrical, mechanical, hydraulic, or pneumatic manner. Amongst others, coils or lifting solenoids may be used by the actuator 110 to move the simulation element 103. A control unit may control the motion and the velocity of the motion of the simulation element 103, in order to correspondingly obtain the desired reflection characteristic of the simulation element 103.

Figure 8:
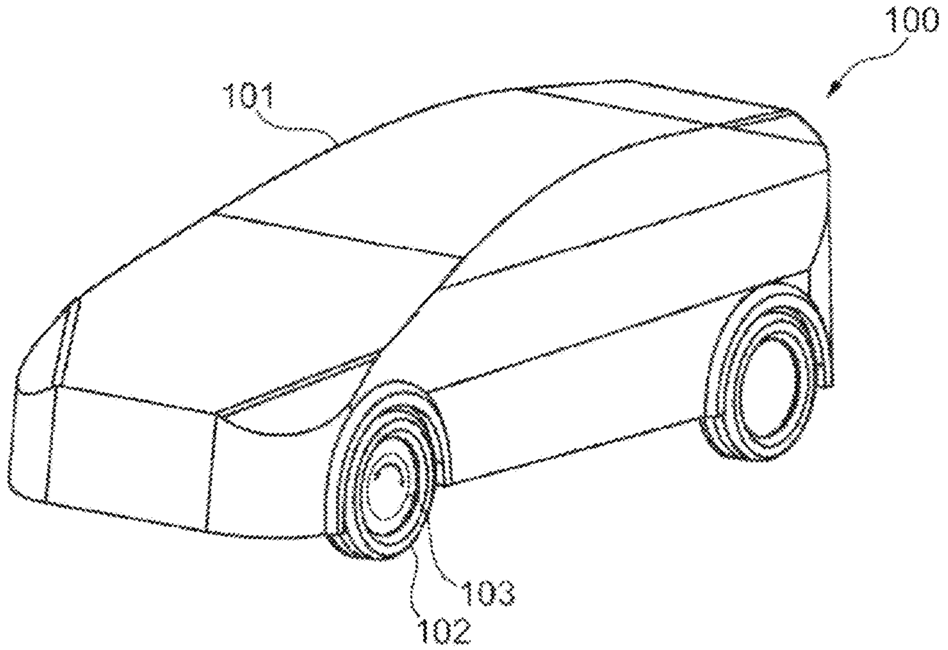
FIG. 8 is a perspective illustration of a dummy device according to an exemplary embodiment of the present disclosure.

FIG. 8 shows a dummy device 100 according to an exemplary embodiment.

The dummy device 100 is a car dummy. Correspondingly, the base body 101 is a car base body. The car base body depicts a car. Therefore, in its geometrical dimensions, it may approximately correspond to an actual car, but may be manufactured from other materials than an actual car and may possess a much less complex structure than an actual car. The car base body comprises a simulation region 102 which simulates a movable element of the car. The movable element to be simulated of the car may be a wheel in this case, in particular a wheel rim. A simulation element 103 is arranged at the simulation region 102 and is movable relatively to the simulation region 102. The simulation element 103 may comprise a disk-shaped element.

Figure 9:
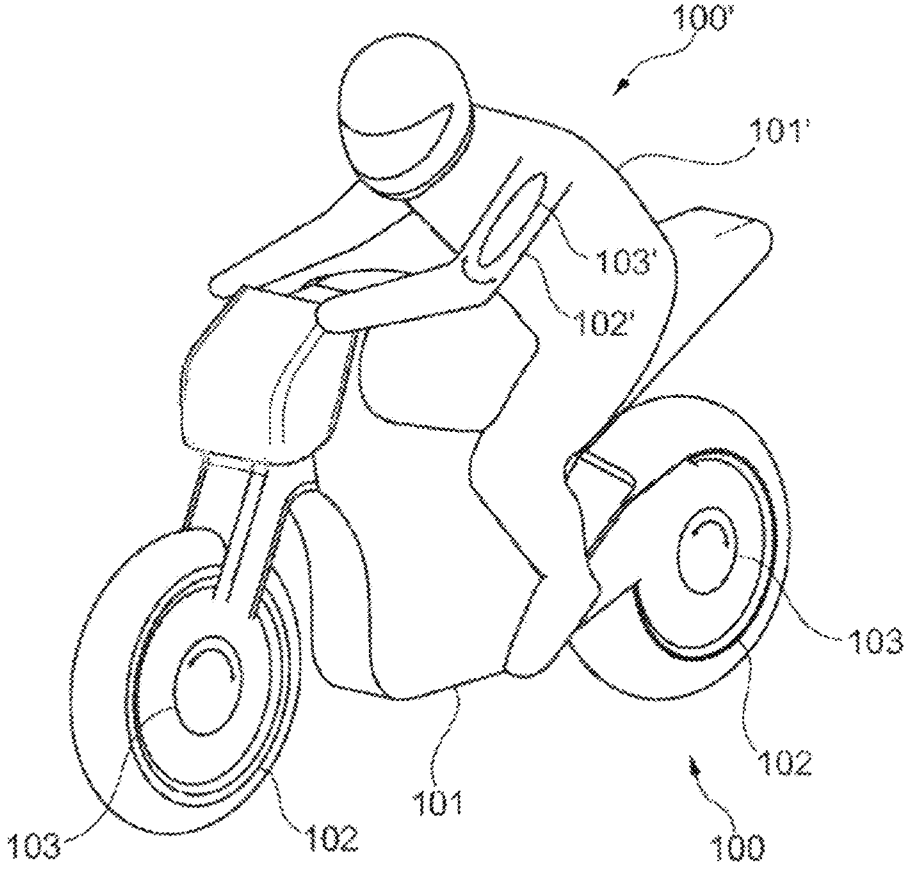
FIG. 9 is a perspective illustration of the dummy device according to an exemplary embodiment of the present disclosure.

FIG. 9 shows a dummy device 100 according to an exemplary embodiment. The dummy device 100 is a motorcycle dummy. Correspondingly, the base body 101 is a motorcycle base body. The motorcycle base body comprises a simulation region 102 which simulates a movable element of the motorcycle. The movable element of the motorcycle to be simulated may be a wheel, in particular a wheel rim. A simulation element 103 is arranged at the simulation region 102 and is movable relatively to the simulation region 102. The simulation element 103 may comprise a disk-shaped element. The front wheel and the back wheel of the motorcycle may be simulated respectively separatedly.

Moreover, in FIG. 9, a driver dummy is shown as a further dummy device 100'. The base body 101' is a driver base body. The driver base body comprises a simulation region 102' which simulates a movable element of the driver. The movable element to be simulated is an arm in this case, in particular an upper arm, of the driver. The simulation element 103' is arranged at the simulation region 102' and is movable relatively to the simulation region 102', for example movable in a pendulum-type manner. The simulation element 103' may comprise a rod-shaped element, for example, which is connected to the simulation region 102' by a hinge. Both dummy devices 100 and 100' may also be interpreted as one single dummy device with multiple simulation regions and corresponding simulation elements.

Figure 10:
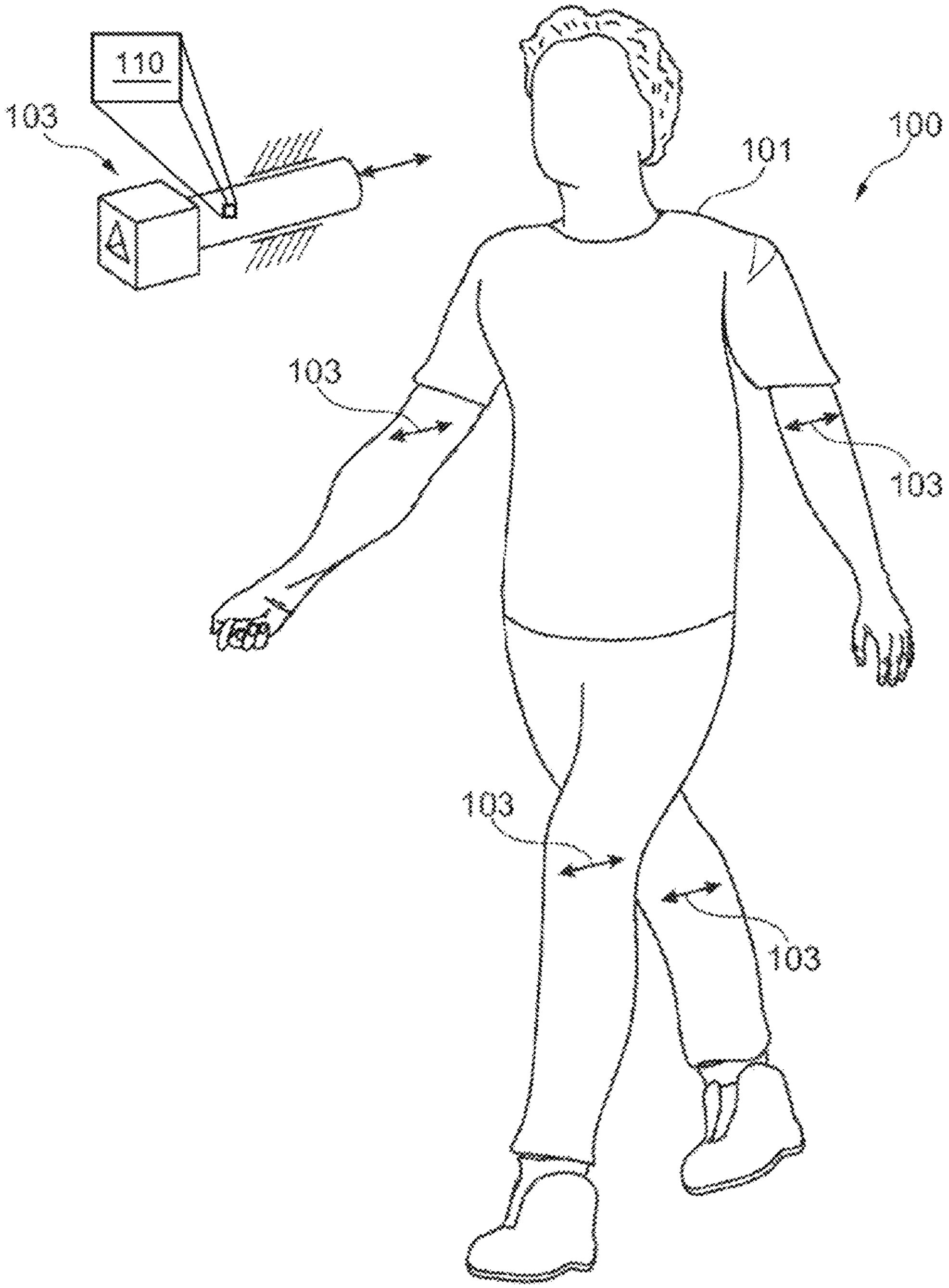
FIG. 10 is a dummy device and a detail view of an associated simulation element according to an exemplary embodiment of the present disclosure.

FIG. 10 shows a dummy device 100 according to an exemplary embodiment.

In this case, the dummy device 100 is a human dummy. The base body 101 of the dummy is rigid, i.e. has no movable parts. In particular, the arms and the legs of the dummy are immovable. At each extremity, i.e. at each leg and at each arm, a simulation element 103 is movably attached. The simulation elements 103 are respectively attached to the center of the extremities, i.e. at a region of the knee or the elbow. As shown in the detail view on the top left in FIG. 10, the simulation elements 103 are formed correspondingly to the embodiment which is shown in FIG. 6. As shown schematically in the detail view, and as arranged in FIG. 7, movement of the simulation elements 103 is enabled by one or more actuators 110. The moving direction of the simulation elements 103 may be perpendicular to the extension direction of the extremities and/or perpendicular to the main extension direction of the dummy.

Supplementary, it should be noted that "comprising" does not exclude any other elements or steps and the article "a" or "an" does not exclude a plurality. Furthermore, it should be noted that features or steps which are described with reference to one of the above embodiments may also be used in combination with other features or steps of other embodiments described above.

LIST OF REFERENCE SIGNS

100 dummy device
101 base body
102 simulation region
103 simulation element
104 retroreflecting element
105 pivoting point
106 rod-shaped element
107 main extension direction
108 reflecting and/or emitting element
110 actuator
201 surface of the simulation element
202 concave region
203 second reflecting and/or emitting element
301 disk
302 further reflecting and/or emitting element
401 further surface of the simulation element
402 convex region
700 test system
701 transmitter
702 receiver
703 signal processing unit
704 transmitted signals
705 reflected signals
710 test unit
$d_s$ radius of the disk
$d_r$ radius of the simulation region

The invention claimed is:

1. A dummy device for performing tests for driver assistance systems, comprising:
a base body with a simulation region, wherein the base body depicts an object to be simulated and the simulation region depicts a movable part of the object to be simulated;
at least one simulation element which is arranged at the simulation region;
wherein the at least one simulation element is configured to reflect signals such that a motion of the movable part of the object to be simulated is simulatable;
an actuator with which the at least one simulation element is movable relative to the simulation region;
a control unit configured to send control signals to the actuator;
wherein the at least one simulation element is smaller than the simulation region and the movable part of the object to be simulated; and
wherein a speed of the at least one simulation element is controllable in dependence on a velocity of the base body by the control unit, wherein the control unit is configured to control the motion and the velocity of the motion of the at least one simulation element.

2. The dummy device according to claim 1,
wherein the at least one simulation element comprises a retroreflecting element.

3. The dummy device according to claim 1,
wherein the at least one simulation element comprises a surface with a concave region.

4. The dummy device according to claim 1,
wherein the at least one simulation element comprises a first surface and a second surface facing the first surface, and
wherein the first surface and the second surface are substantially planar.

5. The dummy device according to claim 1,
wherein the at least one simulation element comprises a radar reflecting element.

6. The dummy device according to claim 1,
wherein the at least one simulation element is attached and rotatably mounted at a pivoting point at the base body, and
wherein the at least one simulation element is configured to perform at least one of a rotational motion and a pendulum motion around the pivoting point.

7. The dummy device according to claim 6,
wherein the at least one simulation element comprises:
a disk which is rotatably mounted at the pivoting point, and
at least one reflecting and/or emitting element which is attached at the disk.

8. The dummy device according to claim 7,
wherein the at least one reflecting and/or emitting element is a metallic reflecting element.

9. The dummy device according to claim 7,
wherein the at least one simulation element comprises a second reflecting and/or emitting element,
wherein the at least one reflecting and/or emitting element and the second reflecting and/or emitting element respectively comprise a first surface and a second surface opposing the first surface,
wherein the first surface is configured to reflect and/or to emit the signals more strongly than the second surface, and
wherein the first surface of the at least one reflecting and/or emitting element and the first surface of the second reflecting and/or emitting element along a circumference of the disk are pointing in opposing directions.

10. The dummy device according to claim 9, wherein the at least one reflecting and/or emitting element and the second reflecting and/or emitting element are alternatingly attached along the circumference of the disk.

11. The dummy device according to claim 7, comprising at least one of the following features:
wherein a diameter $d_s$ of the disk is smaller than a diameter $d_r$ of the simulation region; and
wherein the disk is configured such that it is rotatable with an angular velocity, such that the at least one simulation element is movable substantially with the same velocity as the movable part of the object to be simulated.

12. The dummy device according to claim 1, wherein the at least one simulation element comprises:
a rod-shaped element with a main extension direction substantially in a radial direction from a pivoting point, and
at least one reflecting and/or emitting element attached to the rod-shaped element;
wherein a distance in the radial direction between the pivoting point and the at least one reflecting and/or emitting element is smaller than a diameter of the simulation region.

13. The dummy device according to claim 12,
wherein the rod-shaped element extends from both sides of the pivoting point,
comprises a second reflecting and/or emitting element attached at the rod-shaped element, and
wherein the at least one reflecting and/or emitting element and the second reflecting and/or emitting element are attached on opposing sides of the pivoting point.

14. The dummy device according to claim 1, further comprising:
a rod-shaped element with at least one reflecting and/or emitting element attached at an end of the rod-shaped element.

15. The dummy device according to claim 14,
wherein the rod-shaped element is arranged such that the rod-shaped element is movable with a velocity which substantially corresponds to a velocity component of the object to be simulated; and
wherein the velocity of the rod-shaped element is changeable over time.

16. The dummy device according to claim 1, comprising at least one of the following features:
wherein the base body is configured to simulate at least one of a car, a motorcycle, a bicycle, a human, and an animal; and
wherein the simulation region is configured to simulate at least one of a thigh, a knee, a shank, a foot, an upper arm, an elbow, a forearm, a hand, a paw, a wheel and a wheel rim.

17. A test system comprising:
a dummy device for performing tests for driver assistance systems, comprising:
a base body with a simulation region, wherein the base body depicts an object to be simulated, and the simulation region depicts a movable part of the object to be simulated;
a transmitter configured to transmit signals,
at least one simulation element which is arranged at the simulation region;
wherein the at least one simulation element is configured to reflect the transmit signals such that a motion of the movable part of the object to be simulated is simulatable,
a receiver which is configured to receive reflected transmit signals;
a signal processing unit which is configured to analyze the reflected transmit signals,
wherein the at least one simulation element is smaller than the simulation region and the movable part of the object to be simulated;
an actuator with which the at least one simulation element is movable;
a control unit configured to send control signals to the actuator; and
wherein a speed of the at least one simulation element is controllable, in dependence on a velocity of the base body, by the control unit, wherein the control unit is configured to control the motion and the velocity of the motion of the at least one simulation element.

18. The test system according to claim 17, comprising at least one of the following features:
wherein a frequency distribution of the received reflected transmit signals comprises an information about a motion of the base body and/or the motion of the at least one simulation element;
wherein the base body and the at least one simulation element are configured and movable such that the frequency distribution of the received reflected transmit signals is indicative for a second frequency distribution of a second reflected transmit signal which is reflected from the object to be simulated, and
wherein the frequency distribution is definable by at least one of the following parameters: a width of the frequency distribution, a period duration of a temporal variation of the frequency distribution, an intensity of the frequency distribution and an amplitude and/or a frequency of at least one maximum of the frequency distribution.

19. A method of operating a dummy device, the method comprising:
providing a dummy device with an actuator and a control unit coupled to the actuator, wherein the dummy device comprises a base body with a simulation region and at least one simulation element which is arranged at the simulation region and is movable relatively to the simulation region;
moving the at least one simulation element relatively to the simulation region with the actuator such that a motion of a movable part of an object to be simulated is simulated, wherein the simulation region depicts the movable part of the object to be simulated, wherein the at least one simulation element is configured to reflect signals;
wherein the at least one simulation element is smaller than the simulation region and the movable part of the object to be simulated; and
controlling a speed of the at least one simulation element in dependence on a velocity of the base body by the control unit, wherein the control unit is configured to control the motion and the velocity of the motion of the at least one simulation element.

* * * * *